United States Patent
Moulton et al.

(10) Patent No.: US 9,693,158 B2
(45) Date of Patent: Jun. 27, 2017

(54) IN-EAR MONITORS AND METHODS OF MANUFACTURING

(71) Applicant: Wizard Audio Industries, LLC, Santa Barbara, CA (US)

(72) Inventors: John Moulton, Phayao (TH); Brannan Mason, Santa Barbara, CA (US)

(73) Assignee: WIZARD AUDIO INDUSTRIES, LLC, Santa Barbara, CA (US)

( * ) Notice: Subject to any disclaimer, the term of this patent is extended or adjusted under 35 U.S.C. 154(b) by 0 days.

(21) Appl. No.: 14/874,264

(22) Filed: Oct. 2, 2015

(65) Prior Publication Data

US 2017/0099552 A1    Apr. 6, 2017

(51) Int. Cl.
| | | |
|---|---|---|
| *B29C 39/02* | (2006.01) | |
| *B29C 35/08* | (2006.01) | |
| *B29C 33/38* | (2006.01) | |
| *B29C 39/36* | (2006.01) | |
| *G05B 19/4097* | (2006.01) | |
| *H04R 25/00* | (2006.01) | |
| *H04R 1/10* | (2006.01) | |

(Continued)

(52) U.S. Cl.
CPC ....... *H04R 25/658* (2013.01); *B29C 33/3857* (2013.01); *B29C 35/0805* (2013.01);
(Continued)

(58) Field of Classification Search
CPC .............. H04R 2225/77; H04R 1/1016; H04R 1/1058; H04R 25/65; H04R 25/652; H04R 25/658; H04R 2225/025; H04R 2460/00; Y10T 29/49572; Y10T 29/4998–29/49986; Y10T 29/49995; Y10T 29/4957; B27M 3/00; B29C 33/3842; B29C 2033/3871; B29C 69/001; B29C 2973/009; B29L 2031/3431; G05B 19/4093; G05B 19/40931;
(Continued)

(56) References Cited

U.S. PATENT DOCUMENTS

| 5,487,012 A | * | 1/1996 | Topholm ............ A61C 13/0004 345/420 |
|---|---|---|---|
| 7,263,195 B2 | | 8/2007 | Harvey et al. |

(Continued)

FOREIGN PATENT DOCUMENTS

| WO | WO2006083834 A2 | 8/2006 |
|---|---|---|
| WO | WO2007005119 A2 | 1/2007 |

(Continued)

OTHER PUBLICATIONS http://www.nextengine.com/products (accessed on Oct. 2, 2015).
https://www.rolanddga.com/products/3d/mdx-40a-benchtop-cnc-mill (accessed on Oct. 2, 2015).

*Primary Examiner* — Christopher Besler
*Assistant Examiner* — Matthew P Travers
(74) *Attorney, Agent, or Firm* — Cislo & Thomas, LLP

(57) ABSTRACT

An in-ear monitor and a method for manufacturing the in-ear monitor from a block of solid medium made from a combination of wood and acrylic and finished with an acrylic coating. The manufacturing process utilizes computerized numerical control techniques to subtractively manufacture the in-ear monitor from the block of solid medium. Acrylic pieces are embedded into the wood randomly or in a desired pattern so that each block has a unique design pattern. Each in-ear monitor is manufactured from a block of solid medium, will therefore, have a unique design pattern as well.

12 Claims, 19 Drawing Sheets

(51) Int. Cl.
   *B29L 31/34*     (2006.01)
   *B29L 31/00*     (2006.01)
(52) U.S. Cl.
   CPC ............ *B29C 39/026* (2013.01); *B29C 39/36* (2013.01); *H04R 1/1058* (2013.01); *B29C 2035/0827* (2013.01); *B29C 2793/009* (2013.01); *B29K 2889/00* (2013.01); *B29L 2031/3431* (2013.01); *B29L 2031/3481* (2013.01); *B29L 2031/753* (2013.01); *G05B 19/4097* (2013.01); *H04R 2225/025* (2013.01); *H04R 2225/77* (2013.01); *Y10T 29/49572* (2015.01); *Y10T 29/49995* (2015.01)
(58) Field of Classification Search
   CPC .......... G05B 19/40932; G05B 19/4097; G05B 19/4099; G06F 17/50
   See application file for complete search history.

(56) References Cited

U.S. PATENT DOCUMENTS

| | | | |
|---|---|---|---|
| 7,672,469 | B2 | 3/2010 | Dyer et al. |
| 2004/0107080 | A1* | 6/2004 | Deichmann ............ A61F 11/08 703/6 |
| 2005/0141739 | A1* | 6/2005 | Juneau .................... H04R 25/60 381/322 |
| 2006/0188119 | A1* | 8/2006 | Parker ................... H04R 25/608 381/322 |
| 2010/0017006 | A1* | 1/2010 | Clausen ............... H04R 1/1016 700/98 |
| 2010/0026775 | A1* | 2/2010 | Parsi .................... H04R 25/652 347/110 |
| 2012/0087511 | A1* | 4/2012 | Lumsden ............. H04R 1/1016 381/74 |
| 2013/0051590 | A1* | 2/2013 | Slater ....................... H04R 1/10 381/317 |
| 2014/0140565 | A1* | 5/2014 | Liu ...................... H04R 1/1091 381/380 |
| 2015/0368458 | A1* | 12/2015 | Sun ......................... C08L 67/02 523/400 |
| 2015/0382123 | A1* | 12/2015 | Jobani ................. H04R 1/1016 700/98 |
| 2016/0088410 | A1* | 3/2016 | Chan ........................ G06T 7/35 382/131 |

FOREIGN PATENT DOCUMENTS

| | | |
|---|---|---|
| WO | WO2007018657 A2 | 2/2007 |
| WO | WO2007106164 A2 | 9/2007 |

* cited by examiner

IN-EAR MONITORS AND METHODS OF MANUFACTURING

TECHNICAL FIELD

This invention relates to in-ear monitors and methods for manufacturing in-ear monitors.

BACKGROUND

The custom in-ear monitor (CIEM) industry has its roots firmly planted in the hearing aid industry. The first CIEMs were designed using hearing aid technology (ex. balanced-armature drivers) and were built using similar manufacturing processes (ex. hard acrylic shells with hypoallergenic lacquer finish). However in the past three to five years, the market for OEMs has exploded along with the general consumer portable audio segment. Once a tool used exclusively for performing artists and music professionals, CIEMs today are a product of choice for audiophiles and music-lovers on-the-go due to their size, efficiency, and customizability.

While balanced-armature (BA) driver technology has developed significantly to keep up with market demands, such developments are slow (a result of there being only two major BA driver manufacturers in the world: Knowles and Sonion) and are available to everyone. As a result, CIEM manufacturers have been creative in developing and marketing ways to differentiate their offerings from their competitors. Examples include silicone CIEMs made from malleable silicone instead of hard acrylic that offer more isolation from outside noise, 3D (SLA) and printed CIEMs that are quick and cheap to produce.

Like the standard acrylic CIEM, the aforementioned examples represent a re-application of preexisting hearing aid technology and manufacturing processes. These methods are still deficient controlling the thickness of the earshells of these CIEMs, the solid material that can be used, and the customizability and designs that can be offered. Therefore, there is still a need for a new manufacturing process that can provide improved quality of sound, comfort, and aesthetics.

SUMMARY

The present invention is directed to in-ear monitors that can provide improved quality of sound, are comfortable, and inherently provide unique and aesthetically pleasing design patterns, and methods of manufacturing thereof. The in-ear monitors of the present invention are made from solid media. Preferably, the solid media comprises wood and acrylic. Rather than using a mold or 3-D printing technology, the present invention utilizes computer numerical control technology. Therefore, solid medium comprising wood and acrylic is milled into an earpiece based on the physical ear mold impression or a digital impression. The earpiece can be further hollowed out to you creating an earshell with a finely controlled wall thickness, which affects the sound quality. For enhanced quality, the earshell can be coated with acrylic and lacquer. One problem with coating a wood-based material with acrylic is that acrylic does not adhere properly to wood. Therefore, the wood may be pretreated, for example with a type of instant glue (such as SUPER GLUE®)), prior to applying the acrylic coat. The combination of the wood and acrylic solid medium also contributes to the quality of sound as well as the inherent uniqueness of design patterns that arise from the random or patterned distribution of acrylic within the wood.

DETAILED DESCRIPTION OF THE INVENTION

The detailed description set forth below in connection with the appended drawings is intended as a description of presently-preferred embodiments of the invention and is not intended to represent the only forms in which the present invention may be constructed or utilized. The description sets forth the functions and the sequence of steps for constructing and operating the invention in connection with the illustrated embodiments. It is to be understood, however, that the same or equivalent functions and sequences may be accomplished by different embodiments that are also intended to be encompassed within the spirit and scope of the invention.

Figure 1A:
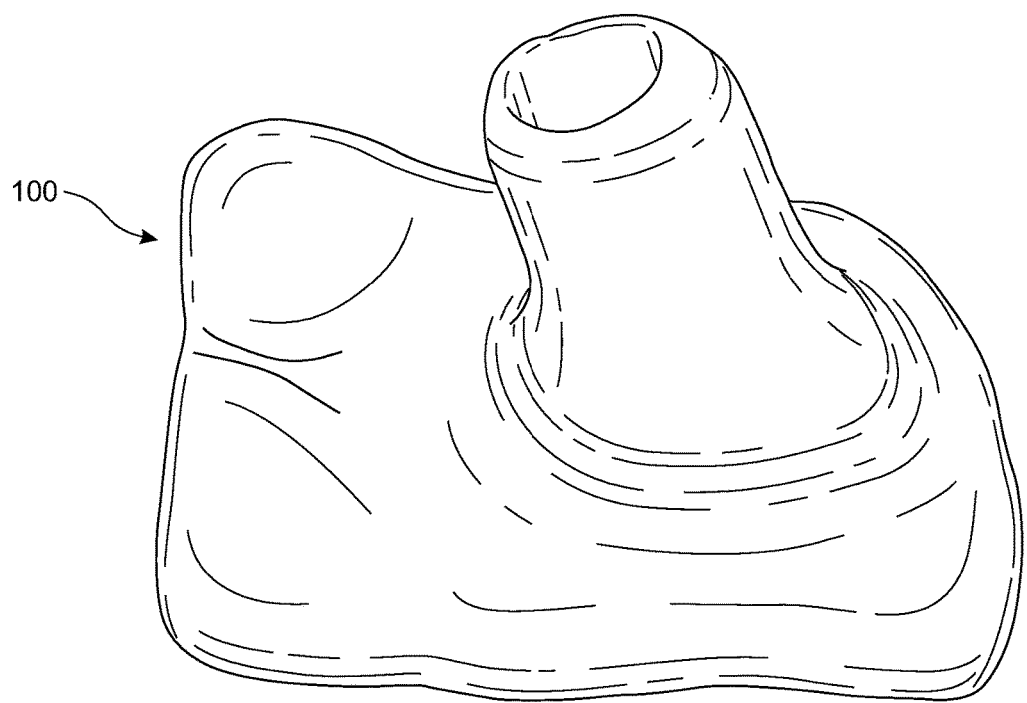
FIG. 1A-1C show perspective views of an embodiment of the present invention.
Figure 1B:
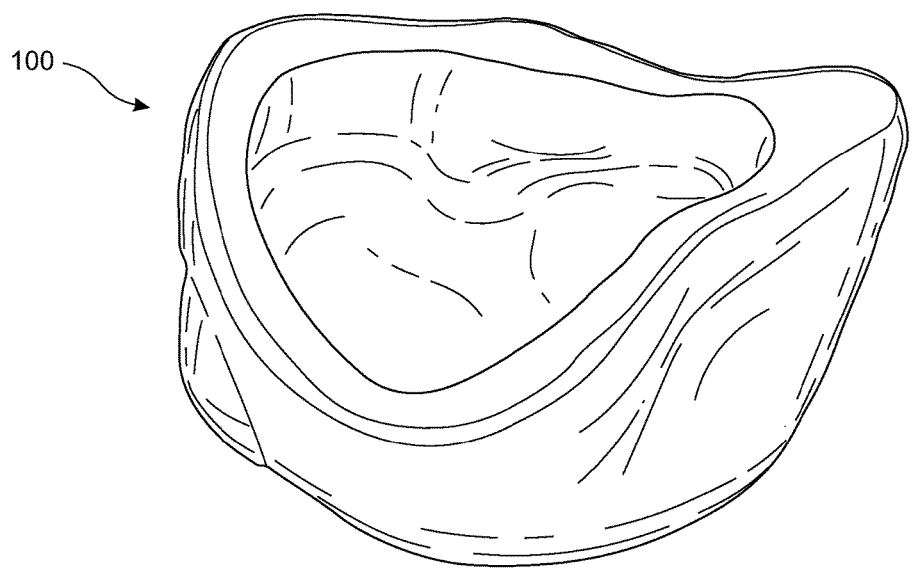
Figure 1C:
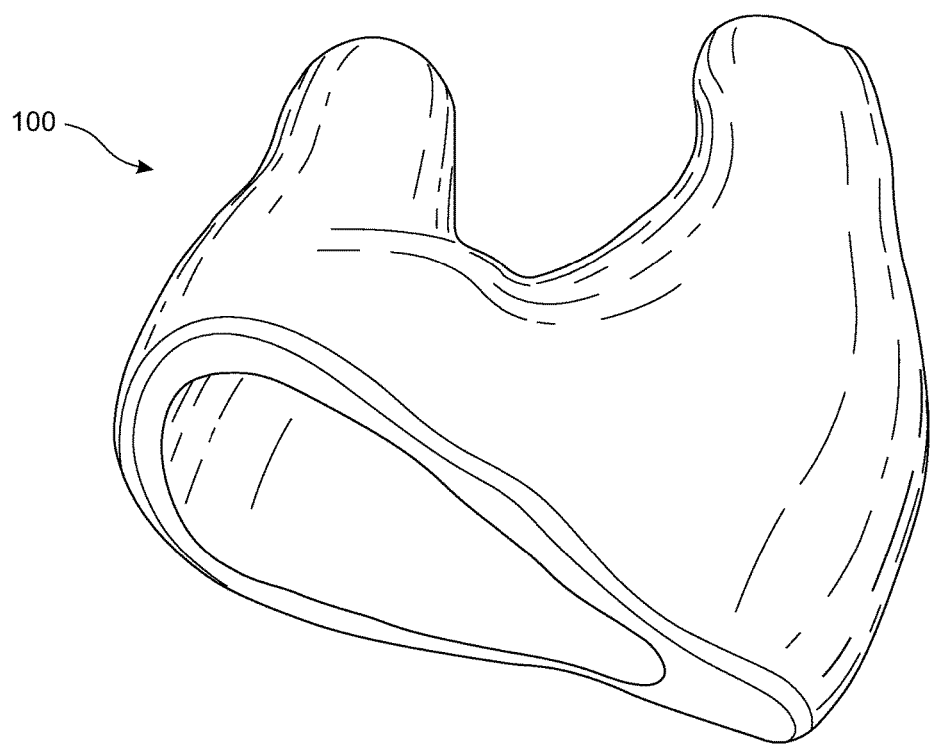
Figure 3:
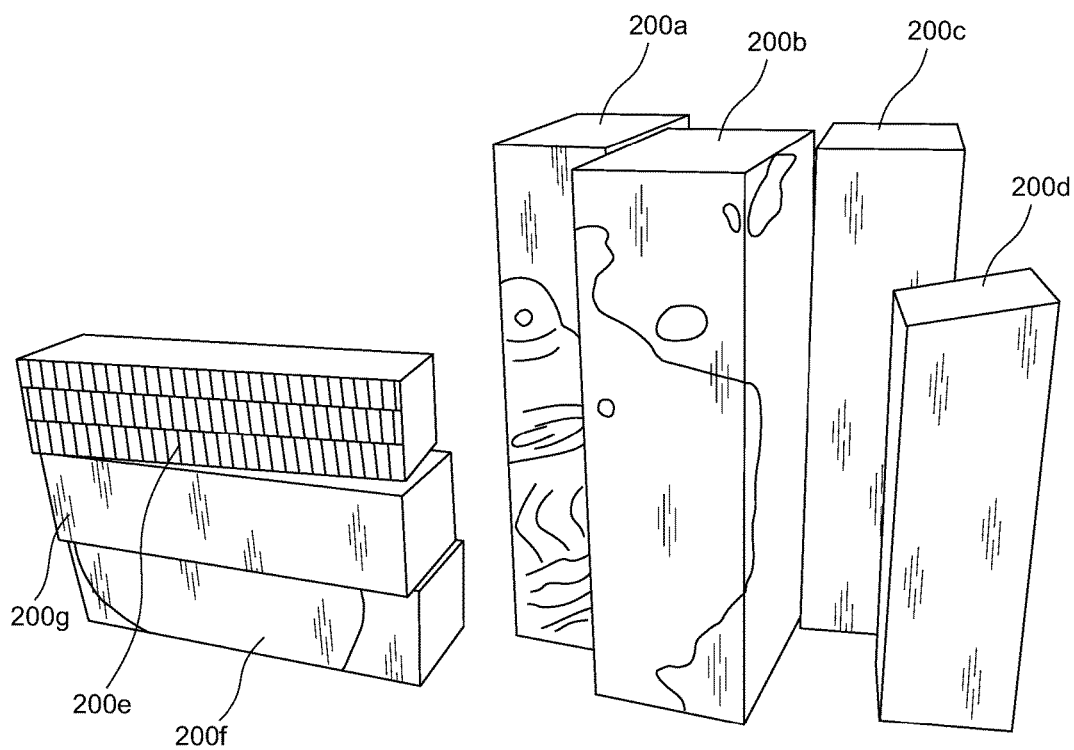
FIG. 3 shows a perspective view of a variety of blocks of solid media for use in the present invention.

The present invention is directed towards in-ear monitors and a new process for manufacturing in-ear monitors, and in particular, in-ear monitor earshells 100 as shown in FIGS. 1A-1C. The process of the present invention utilizes a subtractive manufacturing technique typically not used for manufacturing in-ear monitor earshells 100. The subtractive manufacturing technique starts with a block of solid medium 200 and utilizes a programmed machine 300 to cut away or mill unwanted portions of the solid medium 200 until the desired product is formed from the remaining solid medium. In the preferred embodiment, the solid medium 200 used to manufacture the in-ear monitor earshells 100 comprises a combination of wood and acrylic. Various types of solid mediums 200a-200g are shown in FIG. 3. It is believed that the material that an in-ear monitor is made from contributes to the quality of the sound resonating from the in-ear monitor. Wood, and the combination of wood and acrylic, is believed to provide a better sound quality than acrylic alone, silicone, and other typical materials used to make in-ear monitors.

However, any solid media that can be milled using a subtractive manufacturing technique can be used. By way of example only, the following is a non-exhaustive list of materials that the solid medium 200 may be comprised of: plastic only, plastic composites, wood only, wood composites (wood inlays, compressed wood, etc. . . . ), dyed wood (wood only), genuine honeycomb cast in acrylic resin, aluminum honeycomb cast in acrylic resin, aluminum mesh cast in acrylic resin, shards of carbon fiber cast in acrylic resin, genuine pinecone cast in acrylic resin, genuine acorns cast in acrylic resin, solid knitted fabric material stabilized in clear acrylic resin, bone cast in acrylic resin, macro-molecularly deconstructed then reconstructed metal alloys. Some examples of these are depicted as solid mediums 200a-200g in FIG. 3. By way of example only, Fotoplast S hart manufactured by Dreve Otoplastik GmbH has been used as the acrylic.

The combining of materials, e.g. wood embedded with acrylic, may result in the solid medium 200 having a new design pattern every time. In addition, the design pattern may not necessarily be uniform throughout the entire solid medium 200. Therefore, each in-ear monitor earshell 100 will have a unique design pattern regardless of whether the in-ear monitor earshells 100 are manufactured from the same block of solid medium or different blocks of solid medium. Furthermore, the in-ear monitor earshells 100 of the present invention may be custom-made for each individual user further contributing to the uniqueness of the design and configuration.

Figure 2:
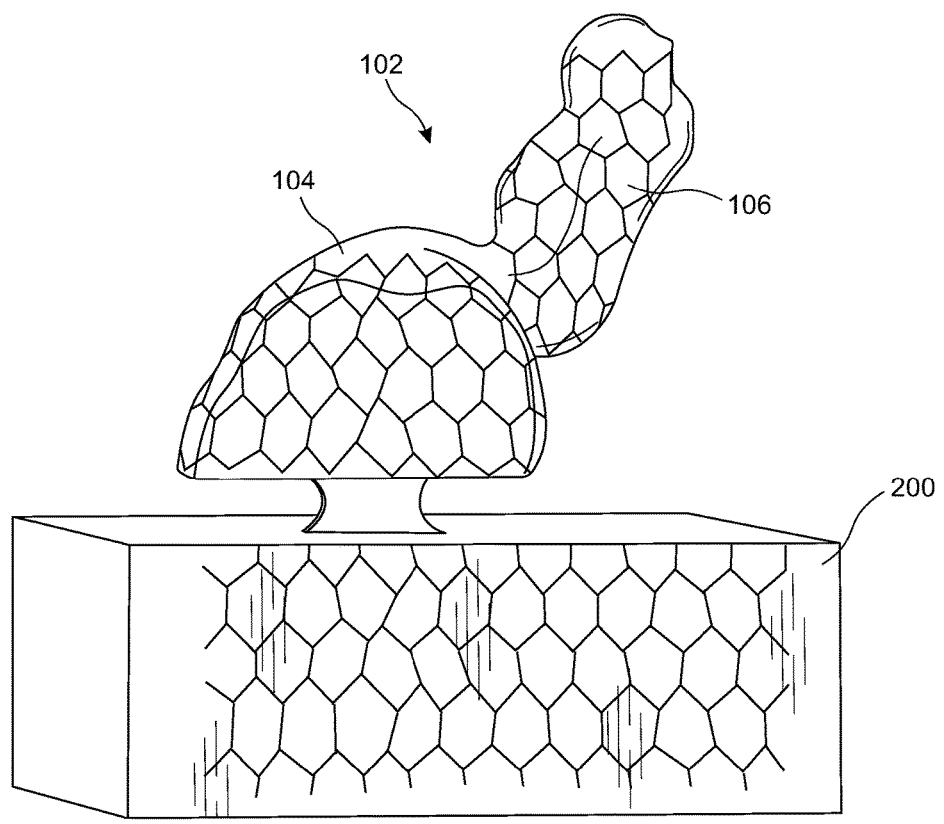
FIG. 2 shows a side elevation view of an embodiment of the earpiece after milling, but still attached to a portion of the solid medium.

While typical in-ear monitor earshells are manufactured from malleable silicone material or 3D stereolithography, additive manufacturing, or 3D printing technology, the present invention utilizes subtractive manufacturing or computerized numeric control milling techniques. The present method for manufacturing in-ear monitor earshell 100 comprises milling a solid medium 200 with a computerized numerical control machine 300 to create an earpiece 102. The earpiece 102 can be hollowed out to create the earshell 100. As shown in FIG. 2, the earpiece 102 comprises a base 104, and an auditory canal member 106 extending from the base 104 and configured to fit inside an auditory canal of a user. The solid medium 200 may be any material suitable for manufacturing earshells 100, such as plastics. However, in the preferred embodiment the solid medium 200 comprises wood and plastic, preferably wood and acrylic.

Wood is an atypical material to use in creating earshells 100. Wood is generally considered to be hard and uncomfortable in the ear, and therefore, not the material of choice for earshells 100. In addition, typical finishes, such as an acrylic coating, used in typical earshells 100 do not adhere to wood, making wood an undesirable choice for earshells 100. The applicants, however, have discovered a method in which wood-containing material can be used successfully to create earshells 100 that produce high quality sounds in a durable product.

Using the process described in the present application, an earshell 100 made from a combination of wood and acrylic, or wood alone, can be finished with a coating of acrylic on an exposed surface of the earshell 100. Preferably, instant, glue, such as cyanoacrylates, although other suitable glues or coatings could be used, may be applied to the exposed surface of the earshell 100 prior to applying the coating of acrylic. It is believed that instant glue or other coating fills the pores of the wood and provides a surface upon which the acrylic coating can adhere. In some embodiments, the finishing step further comprises sanding the glued surface prior to applying the coating of acrylic to smooth out the surface.

Another advantage with using the wood/acrylic composite as a base material is the unique design patterns that can be created by combining wood and acrylic. Wood itself can have unique design patterns on its surface. When pieces of acrylic are randomly embedded into the wood block, unique design patterns emerge as shown in FIG. 3. It is highly unlikely that any two blocks of solid medium 200 will have substantially the same inherent design pattern. Prior art earshells, on the other hand, are generally made from a single material, and will therefore, have a uniform design appearance. Due to the random distribution of the acrylic pieces in the wood block, even a single solid medium may not have any uniformity in design. A single block of solid medium 200 may be used to make multiple earshells 100. However, due to the random distribution of the acrylic pieces in the wood block, earshells 100 manufactured from the same block of solid medium 200 may have a different design pattern.

In the preferred embodiment, the wood is stabilized, then the stabilized wood is cast with acrylic. In some embodiments, the wood may be cast with the acrylic then stabilized. The wood may be stabilized by placing the wood in a pressure chamber with a clear resin that embeds into the cracks and pores of the wood to create a non-porous block. The stabilized wood can then be placed in a mold with acrylic resin to create the solid medium 200.

Figure 4:
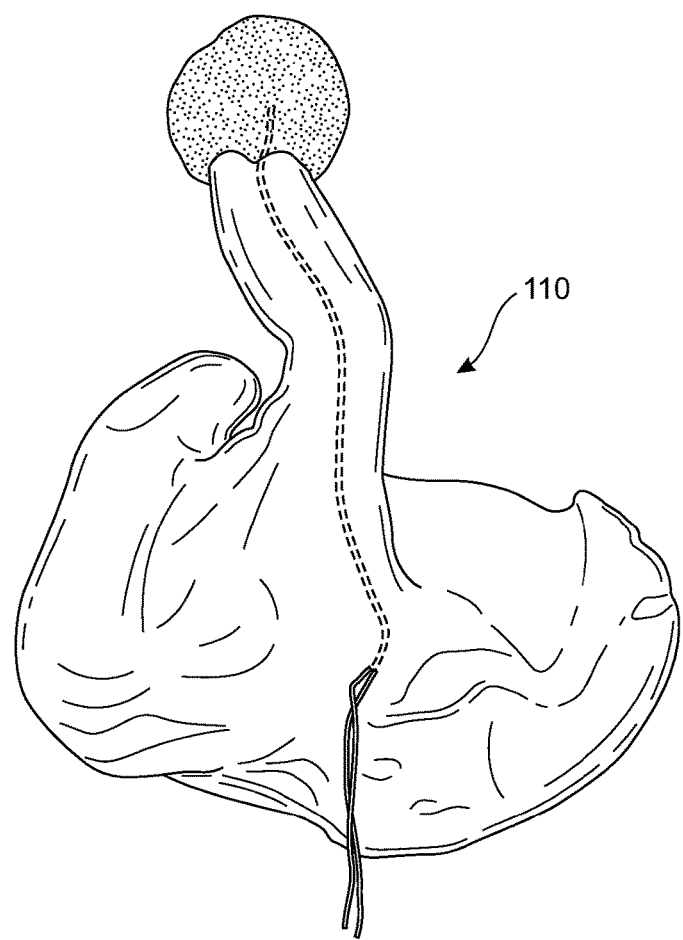
FIG. 4 shows a perspective view of an embodiment of an ear mold impression mold.

The uniqueness, fit, and comfort of earshells 100 made from the process of the present invention can be further improved by manufacturing earshells 100 that are custom designed for the user. For example, earpieces 102 may be derived from an ear mold impression 110 of the user as shown in FIG. 4. A user may go to an otologist or other doctor or technician who can create a mold impression 110 of the outer and external ear, including portions of the auditory canal. The ear mold impression 110 may be obtained and a reverse-cast (not shown) of the ear mold impression 110 can be made. The reverse cast may be made using a colloid, such as a silicone gelatin composition, that is generally transparent. Once the reverse cast solidifies around the ear mold impression 110, the ear mold impression 110 can be removed from the reverse cast leaving a cavity in the reverse cast in the shape of the ear mold impression 110. An acrylic liquid or other suitable material may be poured into the cavity of the reverse cast. The reverse cast containing the liquid may then be exposed to ultraviolet (UV) light to cure the portions of the acrylic liquid exposed to or affected by the UV light.

Figure 5A:
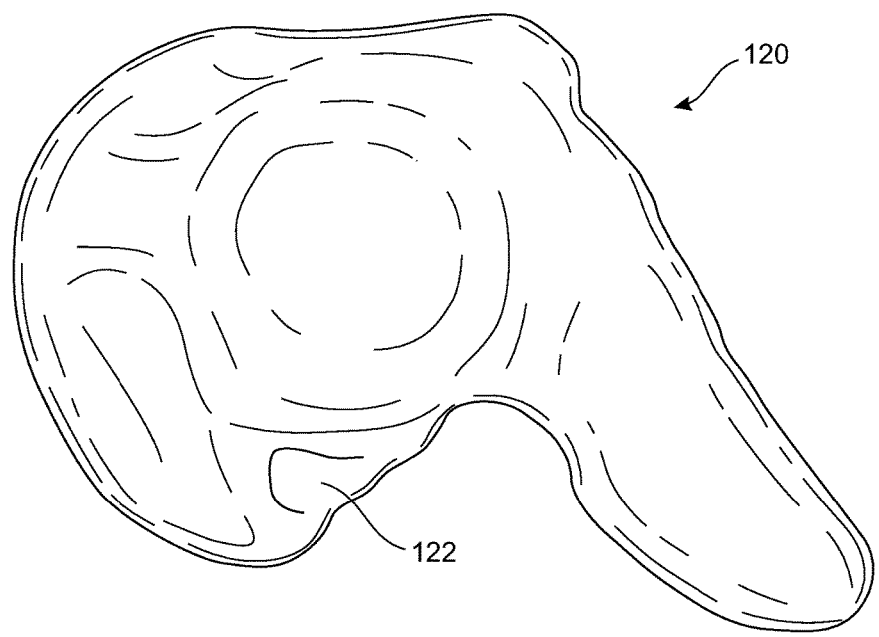
FIGS. 5A-5C show perspective views of embodiments of an acrylic shell.
Figure 5B:
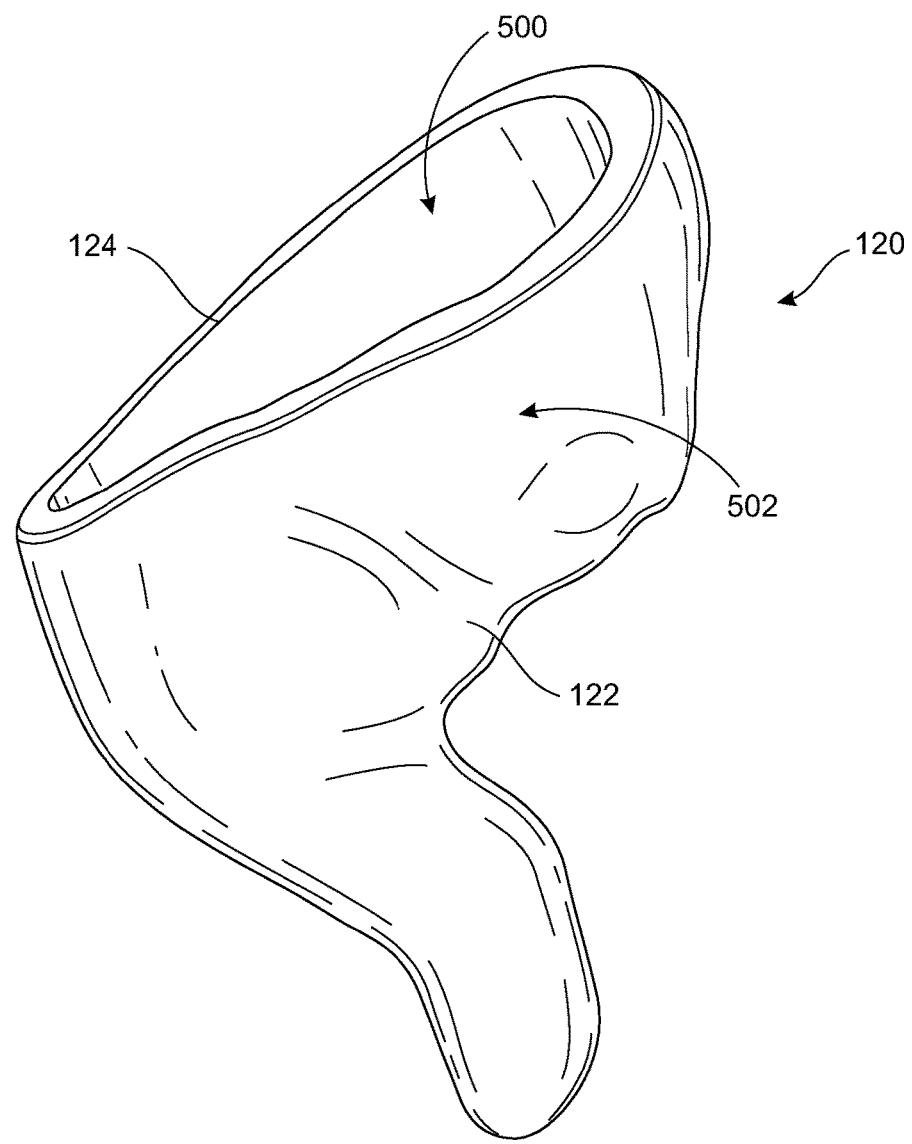
Figure 5C:
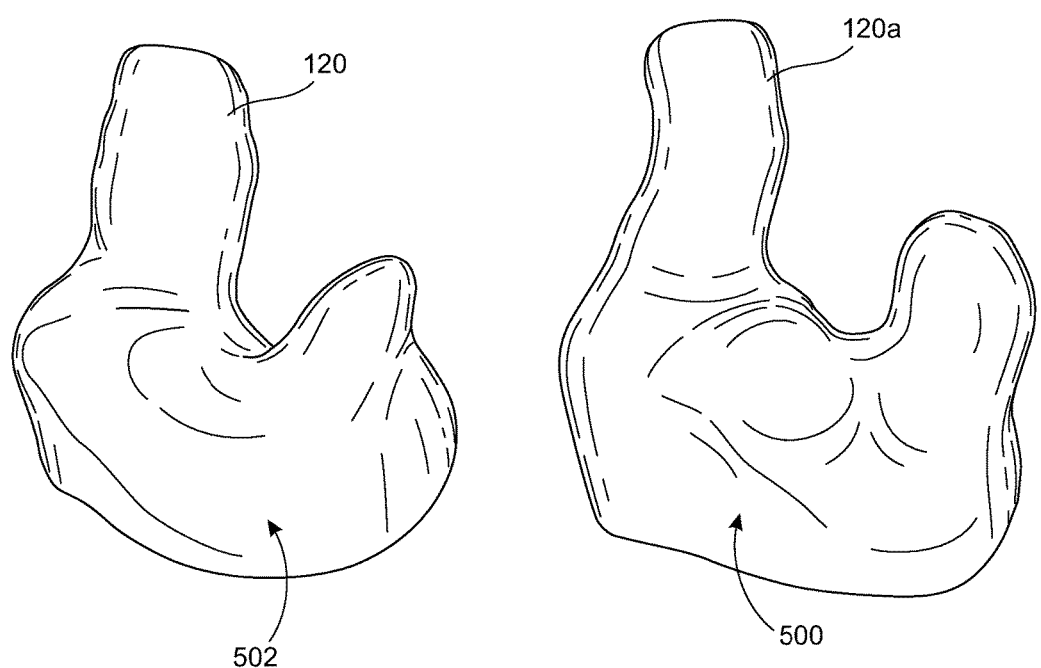

After sufficient curing time, the reverse cast may be removed from the UV light and any excess acrylic liquid that has not been properly cured by the UV light may be removed. This generally tends to be the portions of the acrylic liquid further away from the surface of the reverse cast. When the acrylic liquid that was not cured is poured out, an acrylic shell 120 is left as shown in FIGS. 5A-5C. Therefore, the acrylic shell 120 has an outer surface 122 that mimics the shape of the mold impression 110, and therefore, the user's auditory canal.

The acrylic shell 120 will serve as the basis for collecting the proper data to pass to the CNC machine 300. In order to collect the proper data regarding the surface structure of the acrylic shell 120, the acrylic shell 120 must be scanned. As shown in FIG. 5C, the acrylic shell 120a generally has a reflective or glossy appearance 500 after it has been cured. Scanners generally cannot read surfaces with a reflective or glossy appearance. Colors can also interfere with the scanning step. Therefore, the exterior of the acrylic shell 120a may be sanded or otherwise treated to create a matte finish 502. In addition to the sanding or in place of it, a white powder may be applied to the exposed outer surface, or scannable surface, to create or enhance a matte finish on the acrylic shell 120, thereby creating a matte-finished acrylic shell 120. A matte finished acrylic shell 120 can be made using other techniques such as painting, spray painting, and the like. FIG. 5C also shows the difference between a matte finish 502 and a glossy finish 500. The outer surface 122 of the acrylic shell has been sanded and treated with a white powder. The inner surface 124 remains untreated. Therefore, prior to sanding and treatment with the white powder, the outer surface 122 with the matte finish 502 had the same glossy appearance 500 as the inner surface 124 shows.

Figure 6:
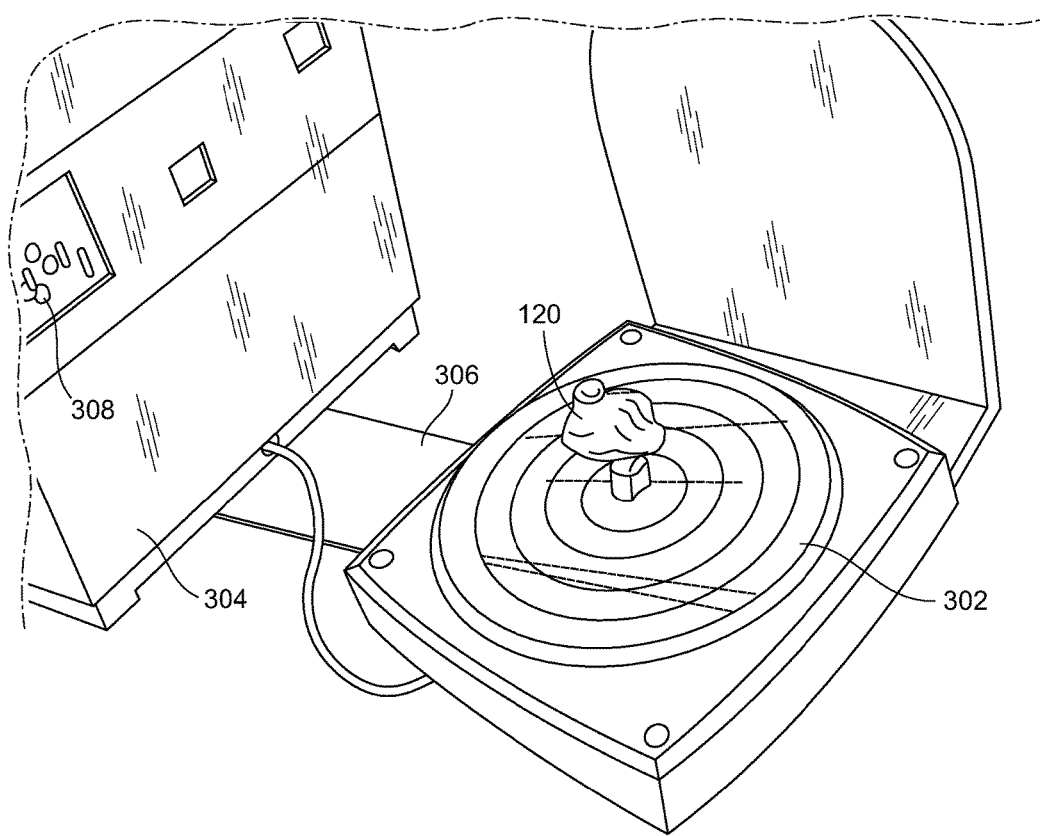
FIG. 6 shows an embodiment of a scanner of the present invention.
Figure 7A:
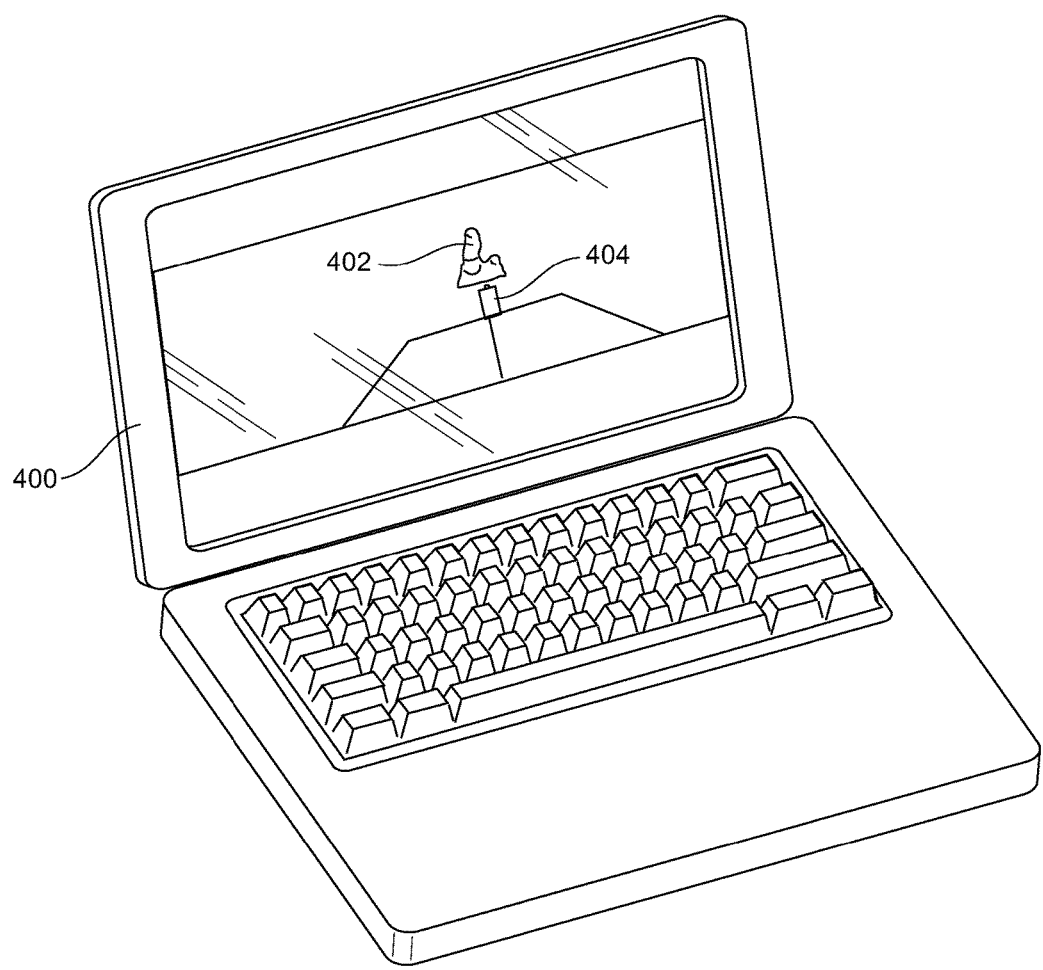
FIGS. 7A-7D show the computer processing steps of the virtual earpiece prior to the milling step.
Figure 7B:
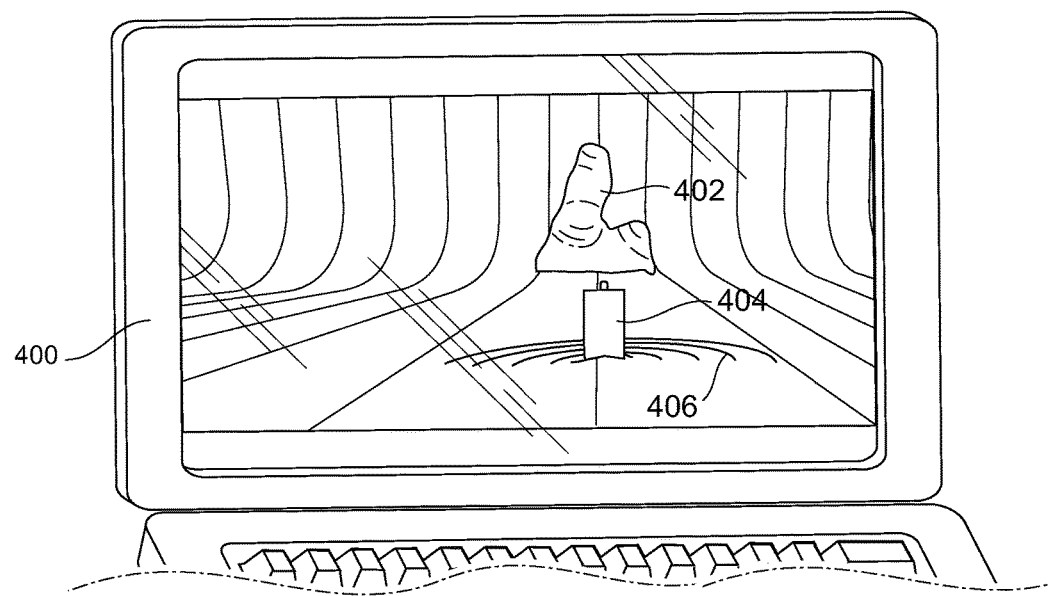
Figure 7C:
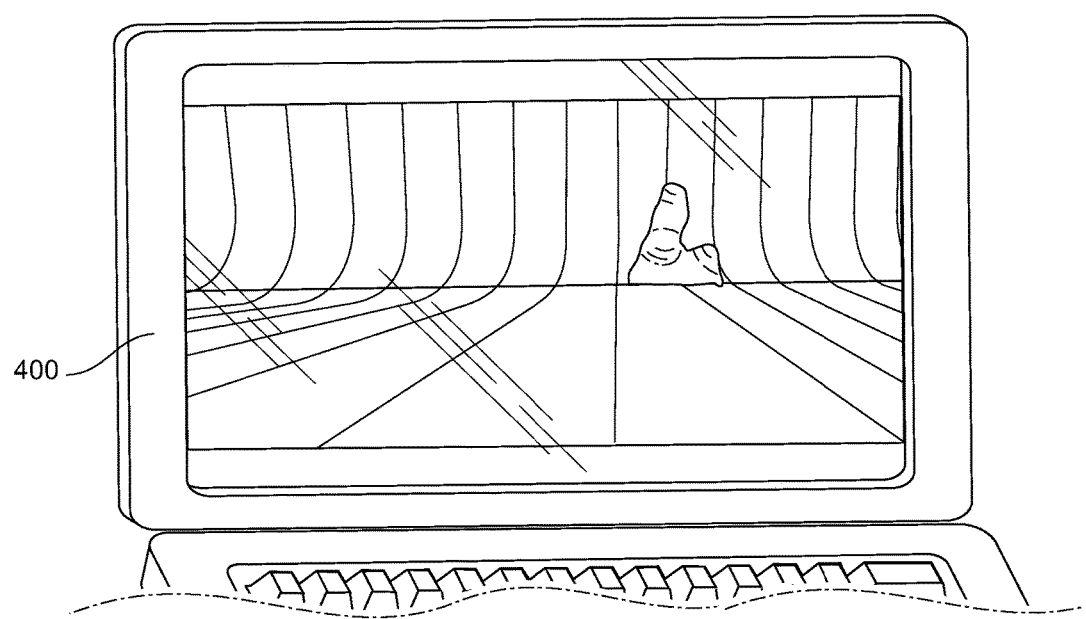

As shown in FIG. 6, the matte-finished 502 acrylic shell 120 may be mounted on a rotator 302 for scanning by a scanner 304 to create a digital image 402. For example, the scanning may be performed by the Next Engine 3D Scanner with the optional MultiDrive arm and HD PRO software, which uses lasers to scan the exposed surface of the matte-finished acrylic shell 120. Other 3D scanners may be used. The scanner 304 may be operatively connected to a computer 400 for processing as shown in FIGS. 7A-7D. The scanner 304 may read unnecessary objects or artifacts 404 in its scanning field that would not contribute to the final product. Therefore, the digital image 402 acquired may be modified with the computer 400 by deleting artifacts 404, 406 so that the digital image 402 and the digital image data that serves as the basis for manufacturing the earshell 100 is the only data to be passed to the CNC machine 300. For example, a scan may result in creating an image of the center post 404 where the shell is held, or parts of the rotator 406 picked up by the scanner 304. Since these portions will not be milled they can be deleted as shown in FIG. 7C.

In some embodiments, rather than scanning an ear mold impression 110, the digital image 402 may be obtained by scanning the outer and external ear, including portions of the auditory canal directly, for example, by using an in-ear scanner such as that manufactured by United Sciences. The in-ear scanner generates the digital image 402 in 3D that can be directly processed and modified by the computer 400. Therefore, the process of creating ear molds, reverse casts, and acrylic shells can be bypassed, and the earpiece 102 may be derived from a direct scan of the user's ear.

Figure 7D:
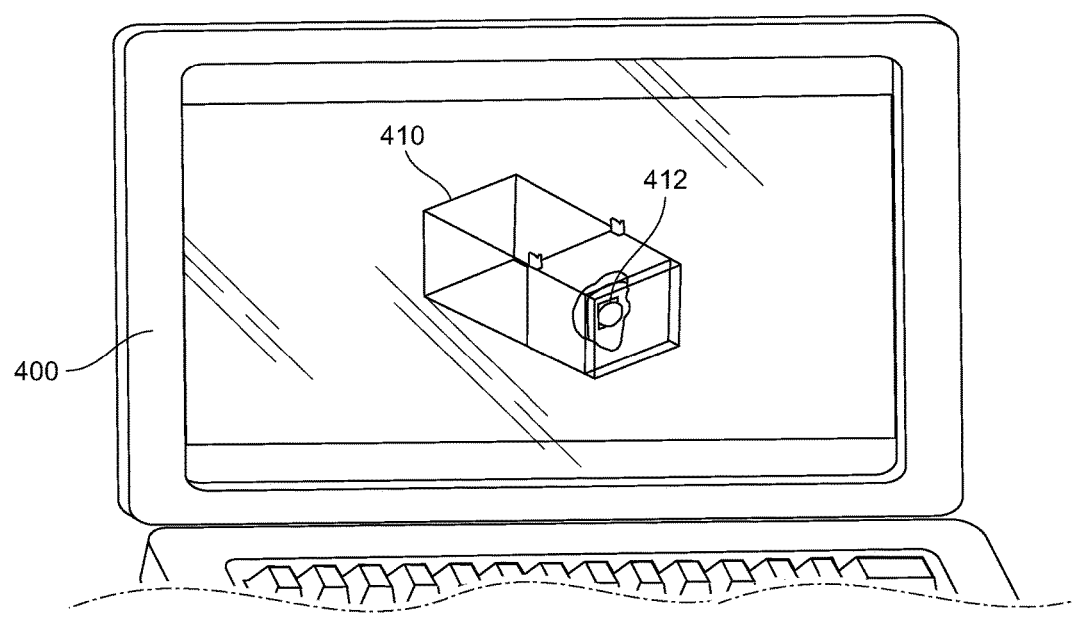

Information regarding the solid medium 200, such as dimensions, may be inputted into the computer 400. The computer 400 may then further process the digital image 402 and the solid medium 200 information and generate a virtual solid medium 410 mimicking parameters of the actual solid medium 200, showing a virtual earpiece 412 at the position where it will be milled in the virtual and actual solid medium 410, 200 as shown in FIG. 7D.

In the preferred embodiment, the matte-finished acrylic shell 120 is scanned at a high resolution, such that the digital image has a resolution of 160,000 points of data per square inch. To assure top surface structure is properly scanned, the matte-finished acrylic shell 120 may be scanned with a 10 degree tilt. For example, the rotator 302 may be mounted on an adjustable arm 306 that can tilt the rotator 302. The scanner 304 shoots a laser 308 across a plane to scan the surface of the matte-finished acrylic shell 120. The matte-finished acrylic shell 120 can then be rotated and the surface scanned again. In the preferred embodiment, the matte-finished acrylic shell 120 may be rotated on an automatic rotator 302 to rotate at approximately 22.5 degrees intervals. With each rotation, the matte-finished acrylic shell 120 is re-scanned across the plane, and this rotating and re-scanning step is repeated until die matte-finished acrylic shell 120 has been rotated 360 degrees.

Figure 8A:
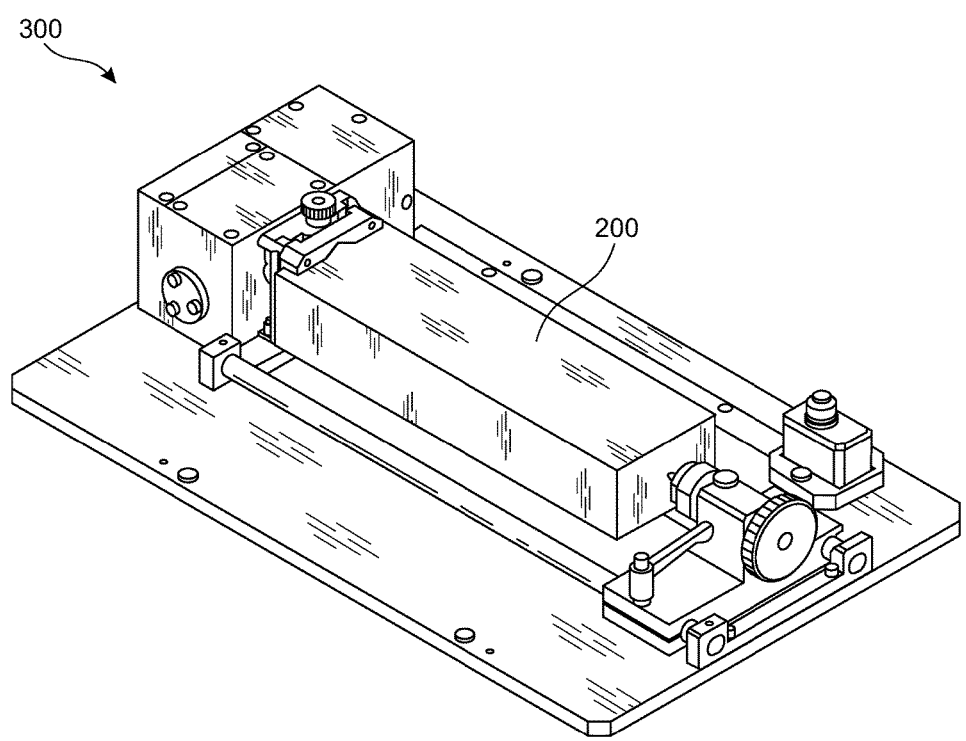
FIGS. 8A-8B show an embodiment of the CNC machine.
Figure 8B:
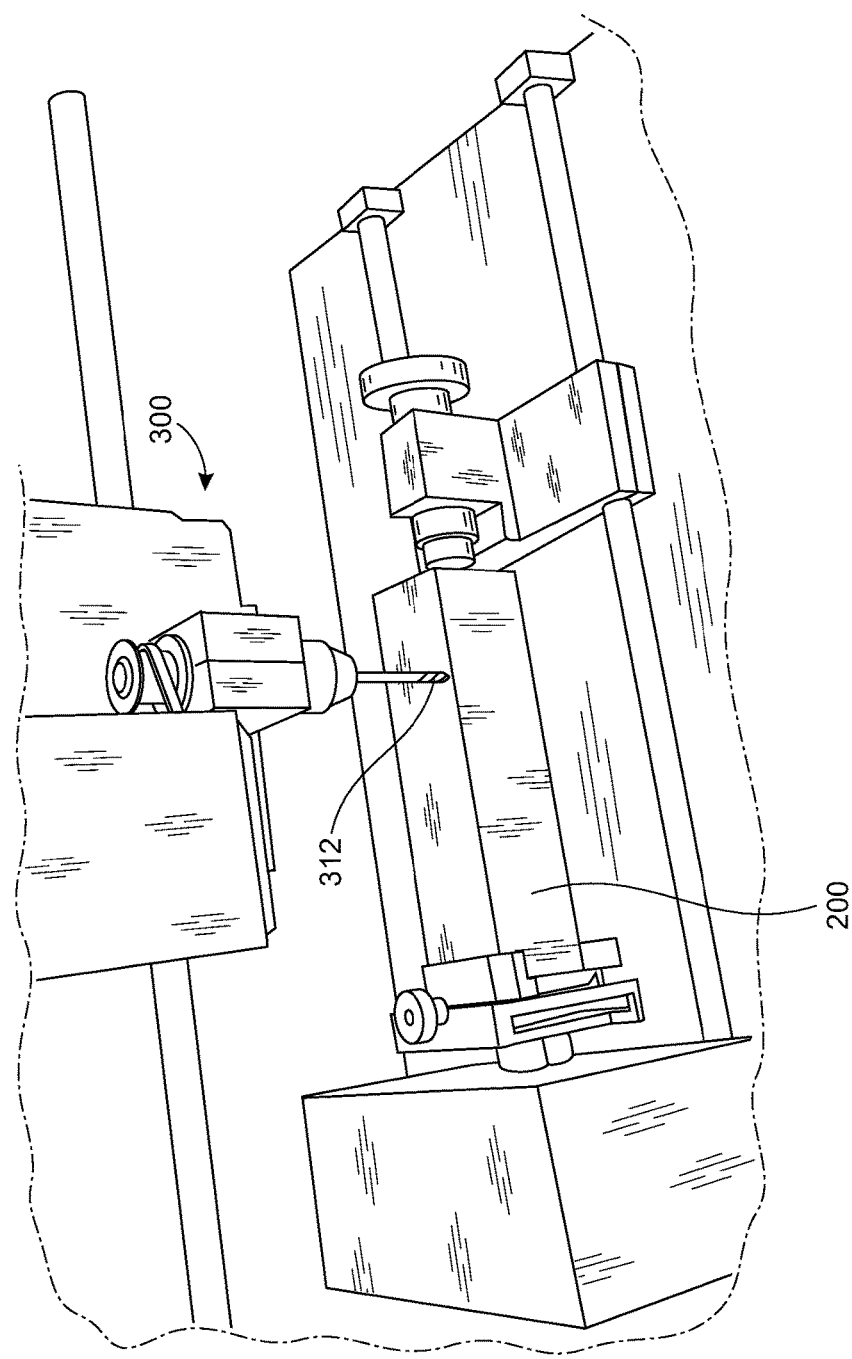

Once the data is processed, the information regarding the virtual solid medium is passed to a computerized numerical control machine 300, preferably having four or more axes, such as the Roland MDX-40A bench top CNC mill with optional ZCL-40A Rotary Axis Unit as shown in FIGS. 8A-8B. The four axes of movement (or degrees of freedom) are: rotation of the solid material along its longitudinal axis, translational movement of the solid material in the forward and backward direction, translational movement, of the drill in the up and down direction, and translational movement of the drill in the left and right direction.

The real solid medium 200 is placed in the milling area of the CNC machine 300, and the solid medium 200 is milled according to the parameters of the virtual solid medium 410 to create the earpiece 102. Preferably, the milling tool 312 utilized is a ⅛ inch ball point tool. A tool smaller in diameter may be used; however, using a much larger tool would result in a loss of detail due to the inherent complexities of the ear. In the preferred settings, the spindle usually runs at 100% speed or 9000 rotations per minute (RPM). The cutting speed (the speed at which the object is cut) is generally kept at 100%.

Figure 1D:
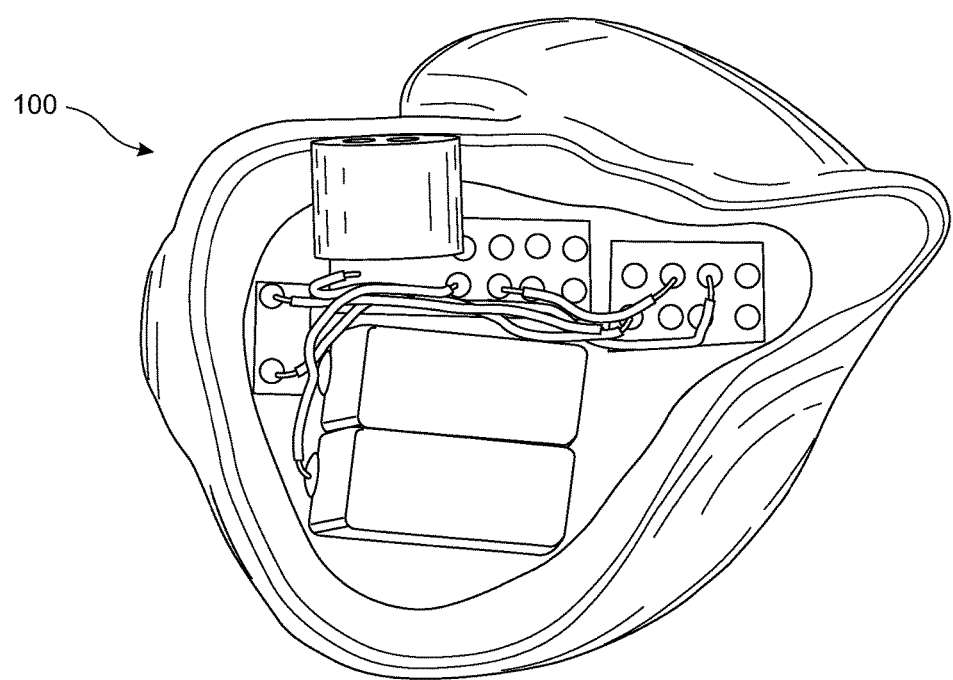
FIG. 1D shows a perspective view of the earshell in FIGS. 1A-1C with the audio components installed to create an in-ear monitor.
Figure 1E:
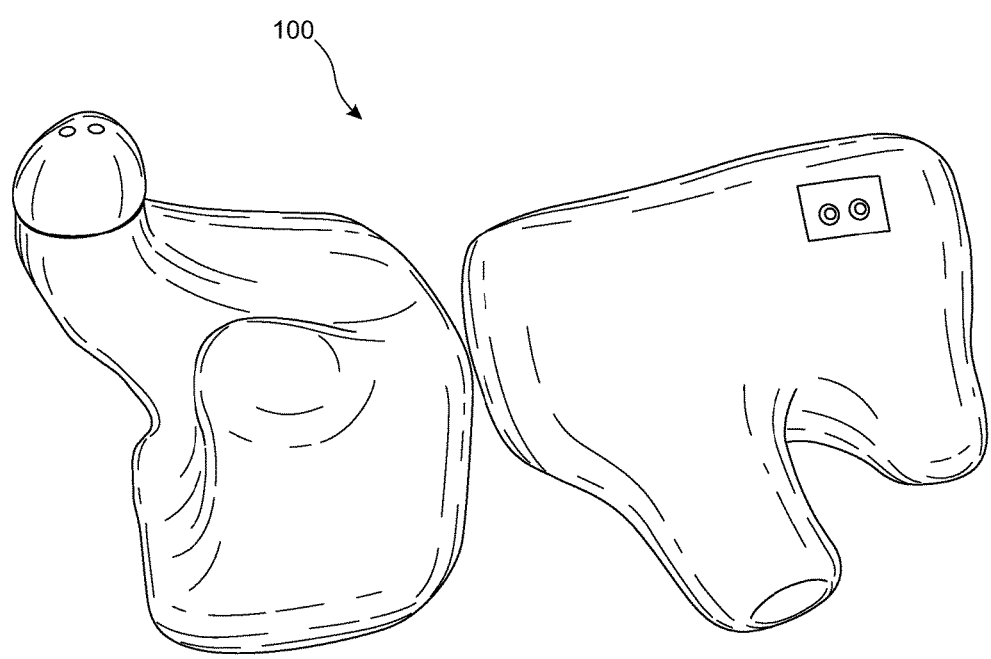
FIG. 1E shows perspective views of a finished in-ear monitor.
Figure 1F:
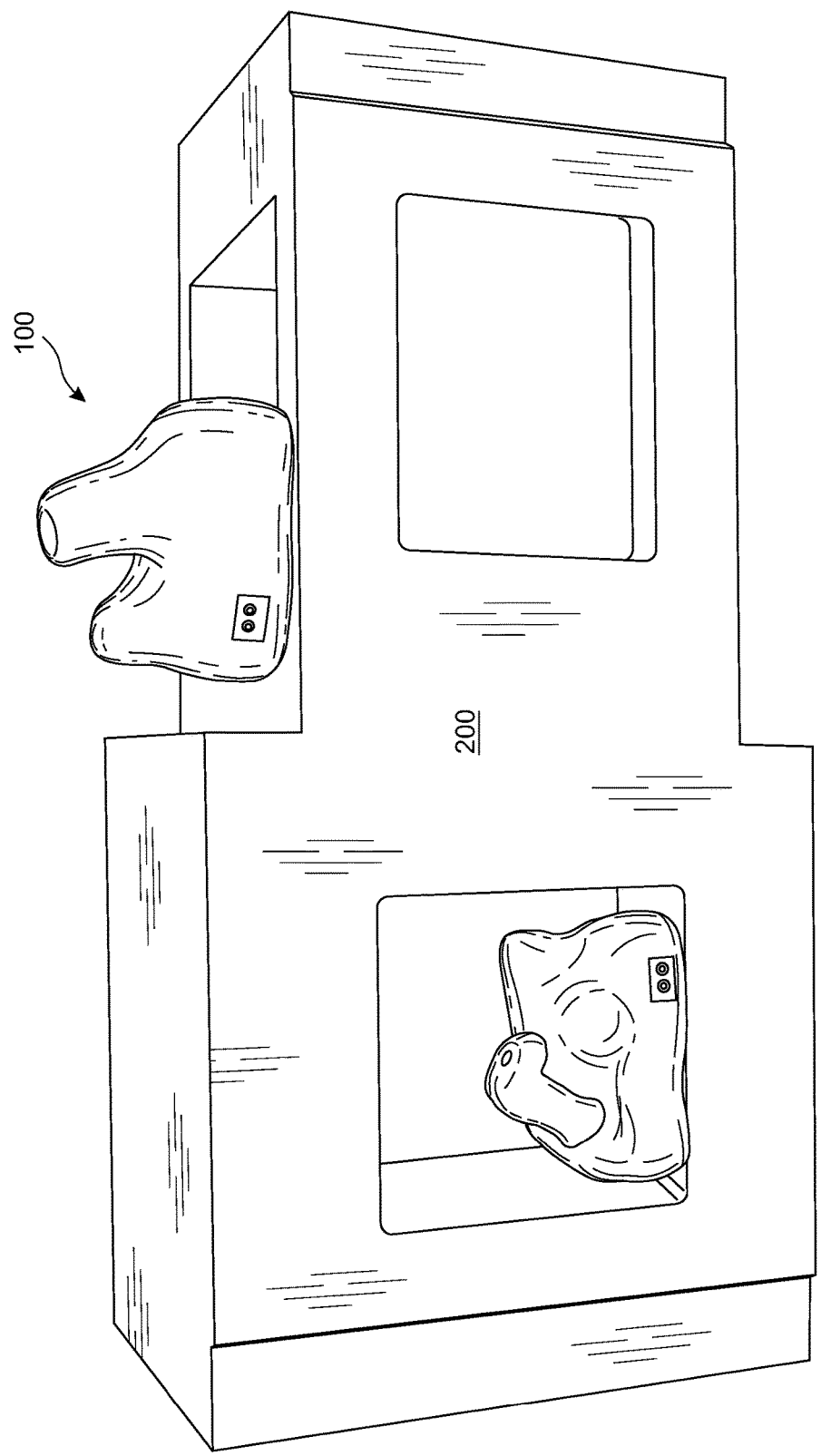
FIG. 1F shows a perspective view of the in-ear monitors displayed on the solid medium from which the in-ear monitors were made.

Once the CNC milling is complete, the earpiece 102 can be hollowed out to create the earshell 100 defining a cavity into which the sound producing components of the in-ear monitor can be housed (see FIGS. 1A-1C). Once the proper components are placed into the earshell 100 (see FIG. 1D), the earshell 100 may be sealed with excess solid medium (see FIG. 1E). As described above, the earshell 100 can be finished with an acrylic coating. The earshell 100 can be further finished by applying lacquer to create the final in-ear monitor (see FIG. 1E). By way of example, only, Fotoplast-Lacquer/3 manufactured by Dreve-Otoplastik GmbH has been used.

The foregoing description of the preferred embodiment of the invention has been presented for the purposes of illustration and description. It is not intended to be exhaustive or to limit the invention to the precise form disclosed. Many modifications and variations are possible in light of the above teaching. It is intended that the scope of the invention not be limited by this detailed description, but by the claims and the equivalents to the claims appended hereto.

What is claimed is:

1. A method for manufacturing a custom in-ear monitor, comprising:
   a. obtaining an ear mold impression of a user;
   b. preparing a reverse cast of the ear mold impression using a silicon gelatin;
   c. pouring an acrylic liquid into the reverse cast;
   d. exposing the acrylic liquid in the reverse cast to UV light to create an acrylic shell;
   e. removing the acrylic shell from the UV light and draining any excess acrylic liquid from the acrylic shell;
   f. sanding the surface of the acrylic shell to create a matte-finished scannable surface and further applying a white powder to the scannable surface of the acrylic shell;
   g. scanning the matte-finished acrylic shell to create a digital image, wherein the digital image has a resolution of 160,000 points of data per square inch, wherein the scanning is performed at a 10 degree tilt and comprises scanning across a plane, rotating the matte-finished acrylic shell approximately 22.5 degrees, re-scanning across the plane, and repeating the rotating and re-scanning step until the matte-finished acrylic shell has been rotated 360 degrees;
   h. modifying the digital image to create a final image having a final image data, wherein modifying the digital image comprises removing images not relevant to the inner ear monitor;

i. processing the final image to be incorporated into a virtual solid medium, the virtual solid medium mimicking parameters of a real solid medium;
j. passing data regarding the virtual solid medium to a computerized numerical control machine having four or more axes;
k. placing the real solid medium on the computerized numerical control machine, wherein the real solid medium comprises wood and acrylic;
l. configuring the computerized numerical control machine to mill the solid medium according to the final image data to create an earpiece, the earpiece comprising a base and an auditory canal member extending from the base and configured to fit inside an auditory canal of the user;
m. hollowing out the earpiece to create an earshell defining a cavity;
n. placing components of the in-ear monitor into the earshell;
o. sealing the earshell with excess solid medium;
p. finishing the earshell by applying instant glue to an exposed surface of the earshell to create a glued surface, sanding the glued surface, and applying acrylic to the glued surface to create a finished earshell;
q. applying lacquer to the finished earshell, whereby the custom in-ear monitor is manufactured.

2. A method for manufacturing an in-ear monitor earshell, comprising:
a. preparing a reverse cast of an ear mold impression using a silicon gelatin;
b. pouring an acrylic liquid into the reverse cast;
c. exposing the acrylic liquid in the reverse cast to UV light to create an acrylic shell; and
d. removing the acrylic shell from the UV light and draining any excess acrylic liquid from the acrylic shell;
e. milling a solid medium with a computerized numerical control machine to create an earpiece based on the shape of the acrylic shell, wherein the solid medium comprises wood and acrylic, the earpiece comprising a base, and an auditory canal member extending from the base and configured to fit inside an auditory canal of a user;
f. hollowing out the earpiece to create an earshell;
g. finishing the earshell by applying a coating of acrylic to an exposed surface of the earshell, whereby the in-ear monitor earshell is made.

3. The method of claim 2, wherein the finishing step further comprises applying instant glue to the exposed surface of the earshell prior to applying the coating of acrylic.

4. The method of claim 3, wherein the finishing step further comprises sanding the exposed surface prior to applying the coating of acrylic.

5. The method of claim 2, further comprising sanding the surface of the acrylic shell to create a matte-finished acrylic shell.

6. The method of claim 5, further comprising applying a white powder to the matte-finished acrylic shell to enhance the matte finish and to create a scannable surface of the acrylic shell.

7. The method of claim 6, further comprising:
a. scanning the matte-finished acrylic shell to create a digital image;
b. modifying the digital image to create a final image having a final image data;
c. processing the final image to be incorporated into a virtual solid medium, the virtual solid medium mimicking parameters of the solid medium; and
d. passing data regarding the virtual solid medium to a computerized numerical control machine having four or more axes.

8. The method of claim 7, wherein the digital image has a resolution of 160,000 points of data per square inch.

9. The method of claim 7, wherein the scanning is performed at a 10 degree tilt.

10. The method of claim 7, wherein the scanning step comprises scanning across a plane, rotating the matte-finished acrylic shell approximately 22.5 degrees, re-scanning across the plane, and repeating the rotating and re-scanning step until the matte-finished acrylic shell has been rotated 360 degrees.

11. The method of claim 10, applying lacquer to the finished earshell.

12. The method of claim 2, wherein the solid medium comprising wood and acrylic creates a unique design pattern that is passed on to the earpiece.

* * * * *